(12) United States Patent
Ishikawa et al.

(10) Patent No.: US 7,983,122 B2
(45) Date of Patent: *Jul. 19, 2011

(54) DEFOCUS DETECTION DEVICE, DEFOCUS DETECTION METHOD AND OPTICAL DISK UNIT USING THE SAME

(75) Inventors: Yoshinori Ishikawa, Yokohama (JP); Motoyuki Suzuki, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 12/360,235

(22) Filed: Jan. 27, 2009

(65) Prior Publication Data

US 2009/0135684 A1 May 28, 2009

Related U.S. Application Data

(63) Continuation of application No. 11/183,085, filed on Jul. 15, 2005, now Pat. No. 7,542,387.

(30) Foreign Application Priority Data

Oct. 28, 2004 (JP) ................................. 2004-313213

(51) Int. Cl.
*G11B 7/00* (2006.01)
(52) U.S. Cl. ............... 369/44.32; 369/44.29; 369/53.28
(58) Field of Classification Search ........................ None
See application file for complete search history.

(56) References Cited

U.S. PATENT DOCUMENTS

| 5,675,561 | A | * | 10/1997 | Yoshioka | .................. | 369/44.25 |
| 6,775,208 | B1 | | 8/2004 | Liu et al. | | |
| 7,542,387 | B2 | * | 6/2009 | Ishikawa et al. | ........... | 369/44.32 |
| 7,710,838 | B2 | * | 5/2010 | Ishikawa | .................. | 369/44.32 |
| 2002/0145952 | A1 | | 10/2002 | Kono | | |
| 2004/0207944 | A1 | | 10/2004 | Ichimura | | |
| 2007/0274167 | A1 | | 11/2007 | Ishikawa | | |

FOREIGN PATENT DOCUMENTS

| JP | 08-030990 | 2/1996 |
| JP | 8185637 | 7/1996 |
| JP | 2001-067686 | 3/2001 |
| JP | 2004-039125 | 2/2004 |

\* cited by examiner

*Primary Examiner* — Christopher R Lamb
(74) *Attorney, Agent, or Firm* — Kilpatrick Townsend & Stockton LLP

(57) ABSTRACT

Defocus detection device and method capable of detecting a defocus accurately during recording of information to an optical disk having a plurality of recording layers and an optical disk unit using the device and method are provided. A temporal restriction is imposed on defocus detection and besides, in comparison with a level for detection of a first change of a focus error signal developing during a defocus, a level for detection of a successively occurring second change of a polarity inverse to that of the first change is made to be smaller. When the first level is exceeded and thereafter the second level is exceeded within a restricted time, a defocus is detected.

3 Claims, 11 Drawing Sheets

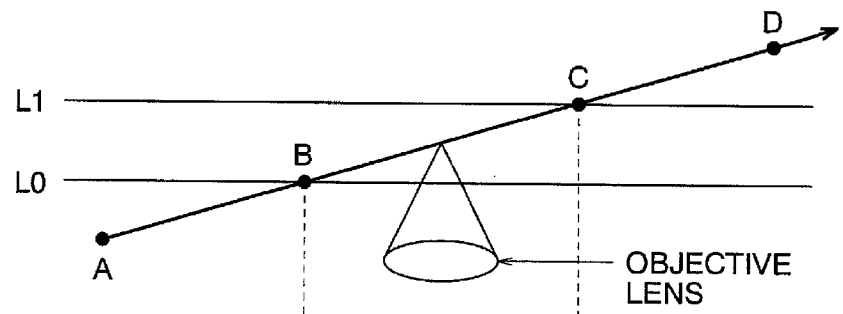
FIG. 2A
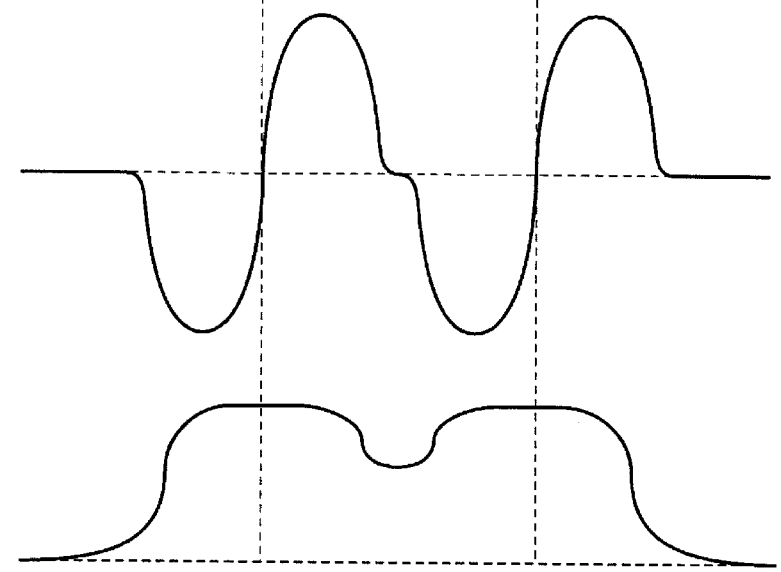
FIG. 2B  FE
FIG. 2C  SUM
FIG. 3
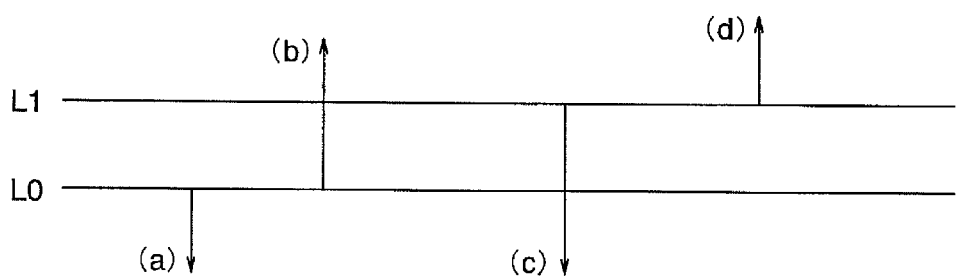

FIG. 7
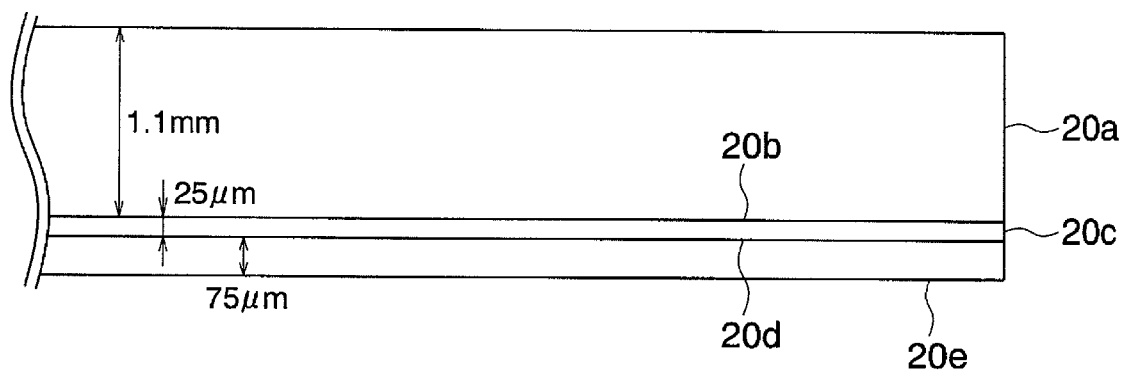
FIG. 8A
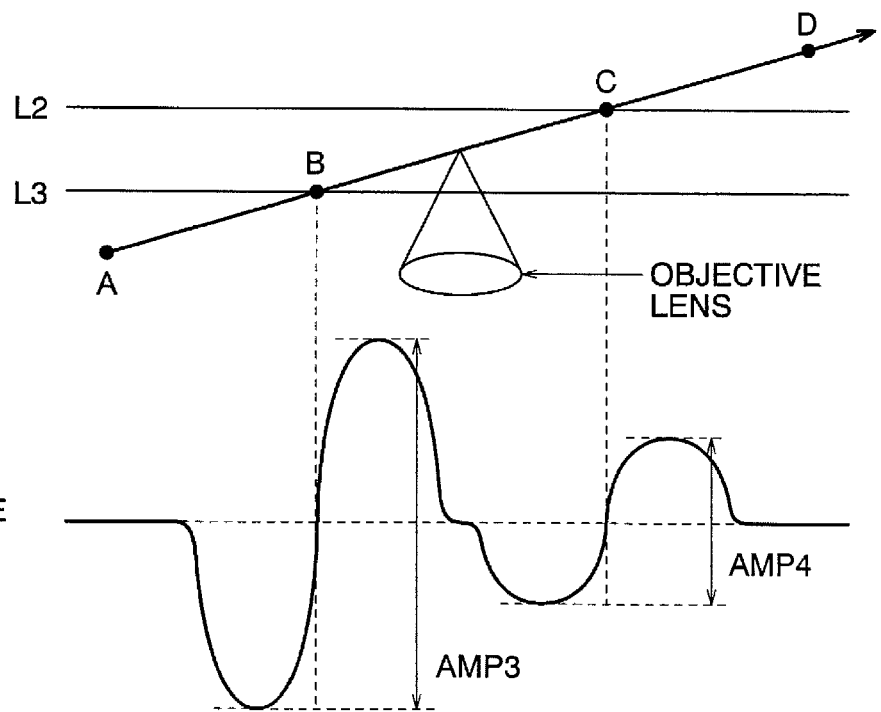
FIG. 8B

DEFOCUS DETECTION DEVICE, DEFOCUS DETECTION METHOD AND OPTICAL DISK UNIT USING THE SAME

CROSS-REFERENCES TO RELATED APPLICATIONS

This application is a continuation of U.S. patent application Ser. No. 11/183,085, filed on Jul. 15, 2005, which claims priority from Japanese Application No. 2004-313213 filed on Oct. 28, 2004, the entire disclosure of which is incorporated herein by reference.

BACKGROUND OF THE INVENTION

1. Field of the Invention

The present invention relates to detection of a defocus during recording in an optical disk unit for recording/reproducing information to/from a recording type optical disk having a plurality of recording layers.

2. Description of the Related Art

In recent years, the recording type optical disk having a plurality of recording layers has been put into practice. In the event that a defocus attributable to any external disturbance takes place in the course of recording data onto the recording type optical disk, there is a possibility that an in-focus point of a laser beam used for recording will pass through another recording layer. If the in-focus point of the laser beam passes through the different layer while the laser beam being conditioned to emanate at recording power, an erroneous record is caused in the layer the beam transmits through. Accordingly, when a defocus is detected during recording, the optical disk unit quickly reduces emission power of laser to a sufficiently low level to prevent an erroneous record on the different recording layer.

For detection of a defocus, JP-A-2001-67686 (Patent Document 1), for instance, discloses a method according to which a signal indicative of the sum of quantities of light reflecting from an optical disk (hereinafter referred to as a SUM signal) is compared with a predetermined level.

Also, Japanese Patent No. 3456040 (Patent Document 2), for instance, discloses another defocus detection method in which a focus error signal (hereinafter referred to as a FE signal) is compared with a predetermined threshold value

SUMMARY OF THE INVENTION

Conventional technologies as above face three problems as below.

Firstly, a first issue will be described.

Referring to FIGS. 2A-2C, a lens locus, a FE signal and a SUM signal when an objective lens is swept in the focal direction are diagrammatically illustrated. A description will be given in connection with FIG. 2 by supposing that an optical disk is in rotation.

More specifically, dual recording layers L0 and L1 of the optical disk and the operation locus of the objective lens are illustrated in FIG. 2A, with the recording layer L0 arranged on the side of the objective lens. As the objective lens shown in the figure sweeps in the focal direction while the optical disk being rotated, an in-focus point of a laser beam focused by the objective lens traces a locus as indicated by a straight line passing through point A through point D.

In such an instance, the laser in-focus point is brought into just focus on the recording layer L0 at point B and further on the recording layer L1 at point C.

As the objective lens operates in this manner, the FE signal develops as shown in FIG. 2B and similarly, the SUM signal develops as shown in FIG. 2C.

Upon the instant the objective lens passes through the recording layer L0 and the instant it subsequently passes through the recording layer L1, the FE signal assumes an S-shaped waveform and the SUM signal peaks near just focus points. The SUM signal slightly decreases in level between the two recording layers.

The defocusing in the multi-layer disk is sorted into 4 kinds of out-of-focus. More particularly, the lens defocuses from an in-focus state on the recording layer L0 toward the objective lens as shown at an arrow (a) in FIG. 3, defocuses from the in-focus state on the recording layer L0 toward the recording layer L1 as shown at an arrow (b) in FIG. 3, defocuses from an in-focus state on the recording layer L1 toward the recording layer L0 as shown at an arrow (c) in FIG. 3 and defocuses from the in-focus state on the recording layer L1 toward the opposite of the objective lens as shown at an arrow (d) in FIG. 3.

Waveforms of FE signals and SUM signals corresponding to the 4 patterns as illustrated in FIGS. 4A-4D.

Depicted in FIG. 4A are FE and SUM signals obtained when the lens defocuses from the in-focus state on the recording layer L0 toward the objective lens. Similarly, FE and SUM signals obtained when the lens defocuses from the in-focus state on the recording layer L0 toward the recording layer L1 are depicted in FIG. 4B, FE and SUM signals obtained when the lens defocuses from the in-focus state on the recording layer L1 toward the recording layer L0 are depicted in FIG. 4C and FE and SUM signals obtained when the lens defocuses from the in-focus state on the recording layer L1 toward the opposite of the objective lens are depicted in FIG. 4D.

Since, in FIG. 4A, the laser in-focus point traces a locus from point B to point A shown in FIG. 2A, the FE and SUM signals resemble those heading for point A from point B in FIG. 2A. Likewise, the FE and SUM signals in FIG. 4B resemble those heading for point C from point B in FIG. 2A, the FE and SUM signals in FIG. 4C resemble those heading for point B from point C in FIG. 2A and the FE and SUM signals in FIG. 4D resemble those heading for point D from point C in FIG. 2A.

The FE and SUM signals shown in FIGS. 4A and 4D assume waveforms similar to those developing in an optical disk having only one layer of recording plane and therefore in this case a defocus can be detected in accordance with teachings of the conventional technology disclosed in the aforementioned Patent Document 1, that is, by detecting a decrease in level of the SUM signal. On the other hand, the method of Patent Document 1 is difficult to use in the case of in FIGS. 4B and 4C. Reasons for this will be described hereunder.

The SUM signal shown in FIG. 4B or FIG. 4C is for the inter-recording layer and its decreased level is smaller than that of the SUM signal shown in FIG. 4A or FIG. 4D and it is supposed that the lowermost level of the SUM signal for the inter-recording layer is more than or higher than half the amplitude of SUM signal. In the aforementioned Patent Document 1, half the amplitude of SUM signal is defined as a threshold value th and when the level of the SUM signal falls below the threshold value th, a defocus is detected but in the case of in FIG. 4B or FIG. 4C, the decreased level of the SUM signal for inter-recording layer is larger or higher than the threshold value and cannot therefore be detected.

As a consequence, a different threshold value suitable for detection of a small decrease in level of the SUM signal for inter-recording layer needs to be settled and learning of the different threshold value is required, thus giving rise to a problem that the system is complicated. Even if the learning aids a new threshold value in its establishment, the decreased level of the SUM signal is so small that disadvantageously, a noise in SUM signal due to, for example, a scratch on disk surface will be detected erroneously so as to be mistaken for a defocus.

Next, a second issue will be described.

There is sometimes physical strain, caused in the course of production process, in the recording surface of the optical disk. The strain has a frequency component higher than a surface deflection component of disk targeted for external disturbance suppression by servo control but the focus servo gain is not high at the frequency of a distortional portion. In consequence, an external disturbance attributable to strain cannot be suppressed sufficiently and a change in level of the FE signal develops in the distortional portion. If in such an event the distortional portion is large in amplitude and is high in frequency component, the FE signal will sometimes vary to a level approximating the peak of the S-shaped waveform. In this case, the FE signal exhibits a waveform as shown in FIG. 5.

The FE signal varies to assume a waveform (a) as shown at in FIG. 5 when the lens sweep shown in FIG. 2A proceeds. The FE signal changes in the distortional portion of the optical disk in various patterns supposedly including a level variation of FE signal as shown at a waveform (b) or (c) in FIG. 5. In addition, the distortional portion of optical disk is not always limited to one in number over one round of the disk and therefore FE signal variations at waveforms (b) and (c) in FIG. 5 will sometimes be in succession.

In such an event, the method disclosed in Patent Document 2, that is, the method for detecting variations of the FE signal in both the positive and negative levels gives rise to a problem that variations of FE signal attributable to the distortional portion of optical disk as shown at waveforms (b) and (c) in FIG. 5 are erroneously detected so as to be mistaken for defocuses.

Next, a third issue will be described.

FIG. 6A shows a timererpart of the FE signal in FIG. 4A and FIG. 6B shows a timererpart of the FE signal in FIG. 4C, each of the FE signals representing a FE signal which develops when the lens defocuses from a recording layer to an adjoining recording layer.

The FE signals shown in FIGS. 6A and 6B demonstrate that depending on a recording layer on which the lens is in focus during recording, the FE signal first varies convexly in either positive polarity or negative polarity when a defocus develops. Subsequently, the FE signal crosses the 0 (zero) level to change convexly in the polarity inverse to that of the preceding change. A first reference voltage of positive level described in Patent Document 2 (Japanese Patent No. 3,456, 040) as being used for detection of a focus error signal when a defocus develops is indicated by a threshold value th1 in FIGS. 6A and 6B and a second reference voltage of negative level similarly described as being used for detection of a focus error signal when a defocus develops is indicated by a threshold value th2 in these Figures.

Since in this situation the initial peak levels of the FE signals designated by AMP1 in FIG. 6A and AMP2 in FIG. 6B differ from each other in polarity but substantially equal to each other in absolute value, the threshold values th1 and th2 may preferably be equal or substantially equal to each other in absolute value in order to make defocus detection sensitivity equal for variations of the FE signal in both the positive and negative polarities.

Further, the absolute value may preferably be half the peak level from the standpoint of avoiding the influence of noise in the FE signal. When the techniques set forth so far are applied to an optical disk, called blue-ray disk (hereinafter referred to as BD), using a blue laser beam for write/read of data, problems will be entimerered as will be described below. It will be appreciated that the BD of not only a mono-layer BD having a single recording layer but also a double-layer BD having two recording layers has been put into practice.

Referring to FIG. 7, there is illustrated in sectional form a double-layer BD. The double-layer BD has a first recording layer 20b formed on a signal surface of a polycarbonate substrate 20a of 1.1 mm thickness and a second recording layer 20d with intervention of an intermediate layer 20c. The second recording layer 20d is covered with a cover layer 20e of a thickness of 75 μm. In FIG. 7, an objective lens for read/write of data is supposedly arranged beneath the disk.

If, in the optical disk unit for recording/reproducing data to/from the double-layer BD, an optical pickup is optically designed so that the beam spot size of a laser beam may be optimized when the laser beam is focused on the first recording layer 20b, the beam spot size becomes larger when the laser beam is brought into focus on the second recording layer 20d. This is actimered for by the influence of a spherical aberration due to the difference in distance from the disk surface to the recording layer between the first recording layer 20b being 100 μm distant and the second recording layer 20d being 75 μm distant.

Accordingly, the optical pickup incorporates a spherical aberration correction device such as beam expander or liquid crystal corrector and the spherical aberration correction device is adjustable to make the beam spot size optimized on each recording layer. Then, when switching the recording layer to/from which data is written/read, the adjustment value of the spherical aberration correction device must be switched over in compliance with the targeted recording layer.

Referring to FIGS. 8A and 8B, a waveform of the FE signal developing when the lens is swept in the double-layer BD will be explained. Illustrated in FIG. 8A is an operation locus of the objective lens in association with the first and second recording layers L2 and L3 of the double-layer BD, indicating that the beam spot traces a straight line AD as the objective lens rises. In this procedure, the beam spot is brought into just focus on the second recording layer L3 at point B and on the first recording layer L2 at point C.

Illustrated in FIG. 8B is the FE signal when the objective lens operates in the manner as above, exhibiting that a first S-shaped waveform develops around the point B and a second S-shaped waveform develops near the point C.

The amplitude of the S-shaped waveform developing around the point B is designated by AMP3 and that of the S-shaped waveform developing around the point C is designated by AMP4 and signal amplitudes of the two S-shaped waveforms are compared with each other. With the adjustment of the spherical aberration correction device optimized for the recording layer L3, the amplitude AMP4 of the S-shaped waveform developing around the point C is smaller than the amplitude AMP3 of the S-shaped waveform developing around the point B.

Conversely, with the spherical aberration correction device adjusted optimally for the recording layer L2, the amplitude AMP3 of the S-shaped waveform developing around the point B is smaller than the amplitude AMP4 of the S-shaped waveform developing around the point C. In FIG. 8, it is assumed that the spherical aberration correction device is optimized for the recording layer L3. Accordingly, the amplitude AMP4 is smaller in comparison with the amplitude AMP3, amounting to the half or less of the AMP3.

During recording on the recording layer L3 with the spherical aberration correction device optimized for the recording layer L3, the lens defocuses and the beam spot proceeds to the recording layer L2, so that the FE signal assumes a waveform resembling that over point B through point D in FIG. 8A. Namely, a timererpart of the FE signal is depicted in FIG. 9, indicating that a first convex waveform having a peak level of AMP5 first develops and successively a second convex waveform of inverting polarity having a peak level of AMP6 develops.

In case a FE signal in excess of the peak level AMP6 again zero-crosses, causing the beam spot to pass through another recording layer, there results an erroneous record. It is to be noted that the AMP5 is half the AMP3 in FIG. 8B and the AMP6 is half the AMP4 in FIG. 8B.

When the technology described in Patent Document 2 is applied to the waveform as above, the following problem will arise.

As described previously, it is desired that the threshold value th1 for detection of the positive level of FE signal during defocusing be substantially equal in absolute value to the threshold value th2 for detection of the negative level of FE signal and it is further desired that each of the threshold values be half the amplitude of first S-shaped signal, that is, the AMP5 in FIG. 9. Accordingly, in FIG. 9, the half of the peak level AMP5 in FIG. 9 is shown as being a threshold value th3 for detection of the positive level of FE signal and the inverting-polarity level of the th3 is shown as being a threshold value th4 for detection of the negative level of FE signal.

In this situation, the peak level AMP6 has its absolute value being less than half the peak level AMP5, failing to exceed the threshold value th4 and a focus error signal cannot be detected. If countermeasures are taken by making the absolute value of each of the threshold values th3 and th4 half the peak level AMP6, the sensitivity to detection of FE signal becomes high to raise a problem that the FE signal detection is rendered susceptible to the influence of noise in the FE signal.

In view of the three issues as above, the present invention has for its object to provide defocus detection device and method which can detect a defocus accurately and quickly by avoiding the influence of strain in an optical disk and of spherical aberration when the defocus develops during recording on the optical disk having a plurality of recording layers and an optical disk unit using the device and method.

To accomplish the above object, the present invention is constructed as below.

According to one aspect of this invention, a defocus detection device for use with an optical disk having a plurality of recording layers, comprises:

value absolutizing means for determining an absolute value of a focus error signal;

first comparison means for comparing an output of the value absolutizing means with a first predetermined value;

second comparison means for comparing the output of the value absolutizing means with a second predetermined value;

first memory means for storing a polarity of the focus error signal when the first comparison means delivers a signal indicating that the output of the value absolutizing means is larger than the first predetermined value;

second memory means for storing a polarity of the focus error signal when the second comparison means delivers a signal indicating that the output of the value absolutizing means is larger than the second predetermined value;

time measurement means for measuring a predetermined time starting to elapse after the output of the value absolutizing means has gone beyond the first predetermined value; and polarity comparison means for mutually comparing the polarities of the focus error signal stored in the first memory means and the second memory means, wherein in a period during which the polarity comparison means delivers a signal indicating that the two focus error signal polarities are different and measurement by the time measurement means continues, the output of the second comparison means is delivered as a defocus detection signal.

Preferably, in the defocus detection device, the second predetermined value may be smaller than the first predetermined value.

According to another aspect of this invention, a defocus detection method for use in an optical disk unit adapted to record/reproduce information to/from an optical disk having a plurality of recording layers, comprises the steps of:

starting a defocus detection operation;

comparing an absolute value of a focus error signal with a first predetermined value;

storing a polarity of the focus error signal when the absolute value of the focus error signal is larger than the first predetermined value;

initializing a timer value;

comparing the timer value with a second predetermined value to perform the defocus detection from the beginning when the timer value is larger than the second predetermined value and comparing the absolute value with a third predetermined value when the timer value is smaller than the second predetermined value;

increasing the timer value and thereafter again comparing the timer value with the second predetermined value when the absolute value of the focus error signal is smaller than the third predetermined value and, when the absolute value of the focus error signal is larger than the third predetermined value, comparing a polarity of the focus error signal at that time with the stored polarity of the focus error signal; and performing the defocus detection operation from the beginning when the polarities are equal to each other and determining a defocus when the polarities are different from each other.

Preferably, the third predetermined value may be smaller than the first predetermined value.

According to still another aspect of the invention, an optical disk unit for recording/reproducing information to/from an optical disk having a plurality of recording layers, comprises the defocus detection device, wherein when the defocus detection device detects a defocus, recording to the optical disk is stopped.

According to still another aspect of the invention, an optical disk unit for recording/reproducing information to/from an optical disk having a plurality of recording layers, comprises the defocus detection method, wherein when the defocus detection method detects a defocus, recording to the optical disk is stopped.

According to the defocus detection of the present invention, a highly reliable optical disk unit capable of preventing erroneous record to a different layer can be provided.

Other objects, features and advantages of the invention will become apparent from the following description of the embodiments of the invention taken in conjunction with the accompanying drawings.

BRIEF DESCRIPTION OF THE DRAWINGS

FIGS. 2A-2C are diagrams useful to explain waveforms developing during focus sweep in a double-layer recording disk.

FIG. 3 is a schematic diagram showing patterns of defocus.

FIG. 7 is a schematic sectional diagram of a double-layer blue-ray disk.

FIGS. 8A and 8B are diagrams useful to explain a focus error signal waveform during focus sweep in the presence of a spherical aberration.

DESCRIPTION OF THE SPECIFIC EMBODIMENTS

Embodiments in terms of hardware and of software will be described hereunder.

Embodiment 1

Figure 1:
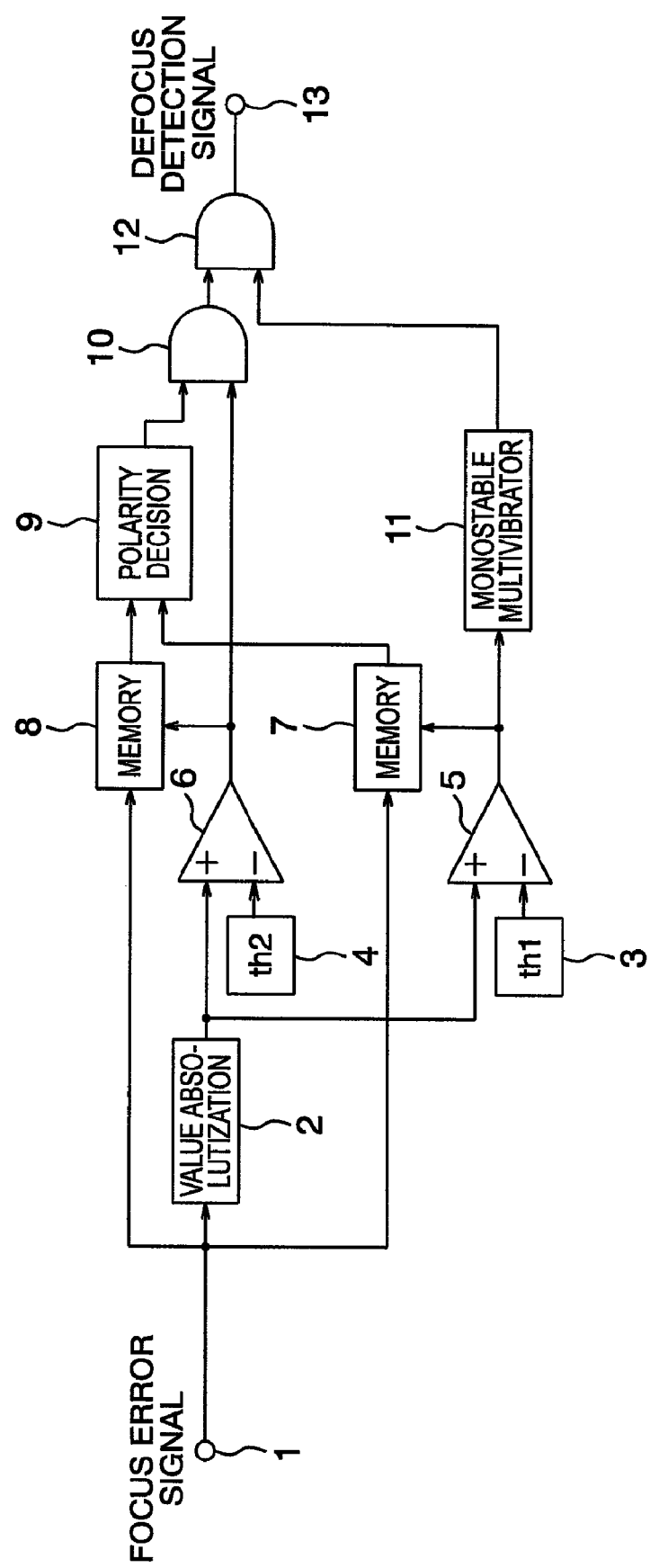
FIG. 1 is a block diagram of a defocus detection device according to a first embodiment of this invention.
Figure 4A:
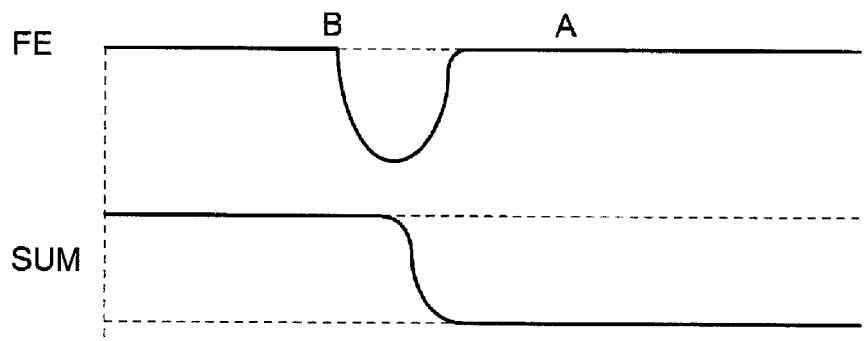
FIGS. 4A-4D are diagrams showing waveforms of focus error signal and sum signal in all patterns during defocus.
Figure 4B:
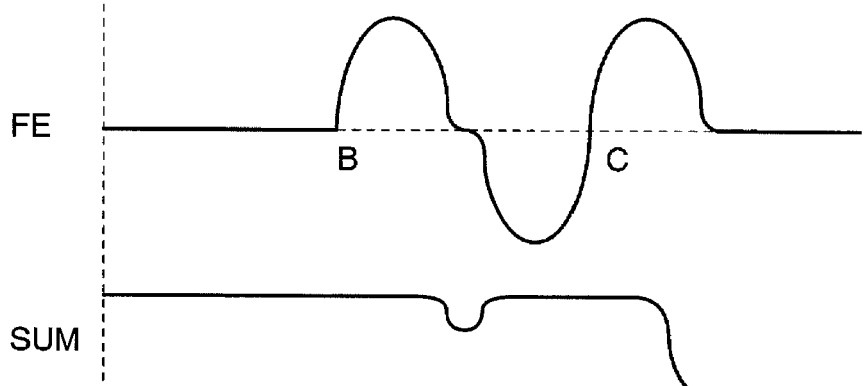
Figure 4C:
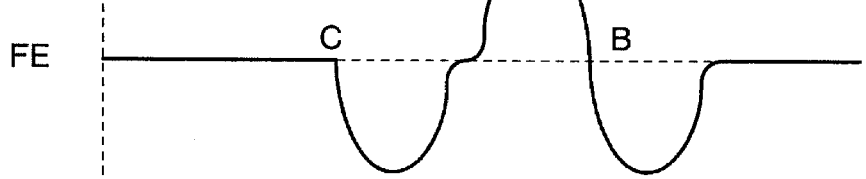
Figure 4D:
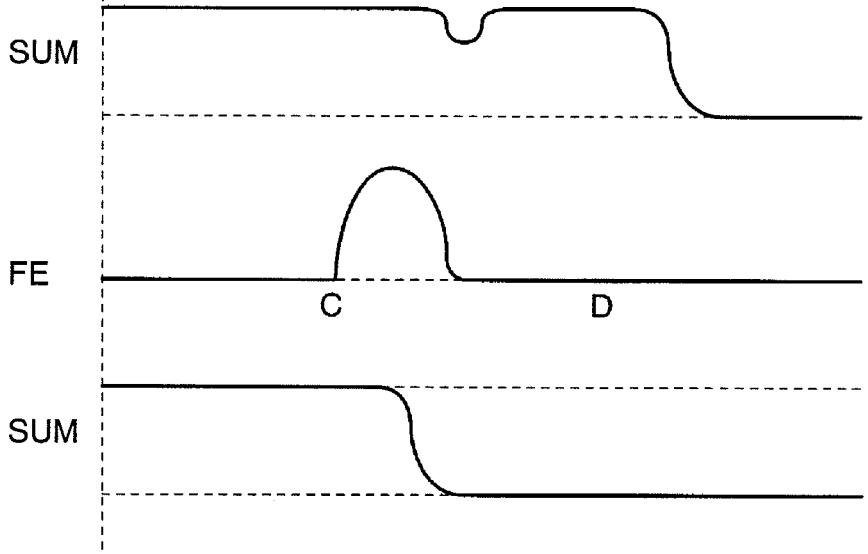
Figure 5:
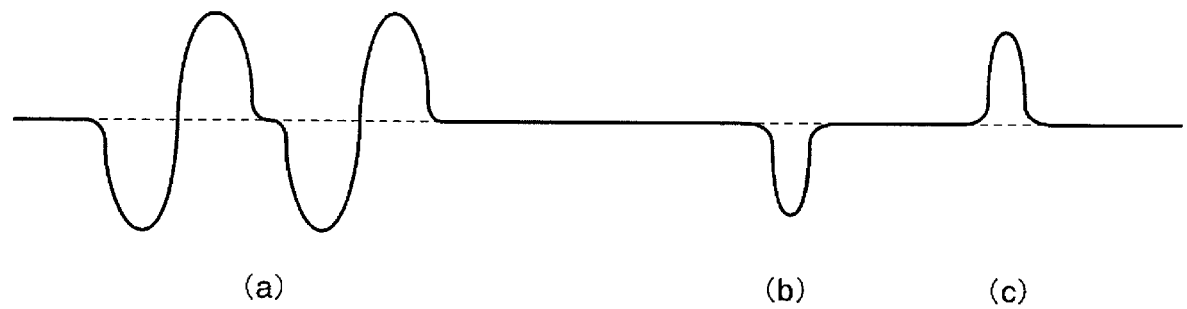
FIG. 5 is a diagram showing a focus error signal waveform during focus sweep and a focus error signal waveform in a distortional portion of a disk.
Figure 6A:
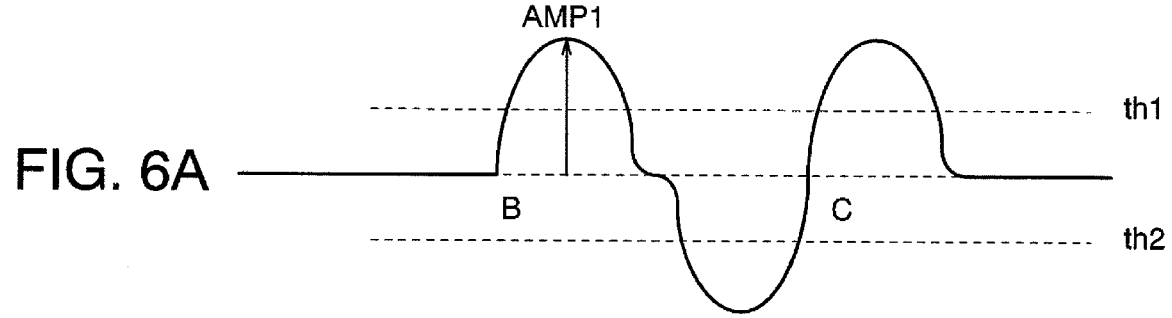
FIG. 6A is a waveform diagram of a focus error signal developing when the lens defocuses toward a different recording layer.
Figure 6B:
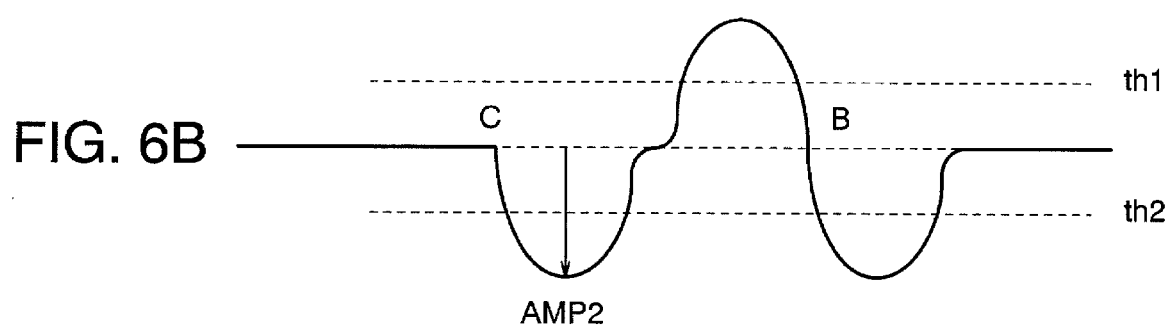
FIG. 6B is a similar waveform diagram of an inverted focus error signal.

A first embodiment of this invention in terms of hardware will first be described with reference to a block diagram of FIG. 1.

A FE signal 1 is a signal generated by using an output of an optical pickup, not shown, in an optical disk unit through known astigmatism method or knife edge method and it indicates a positional error, referenced to the recording surface of an optical disk, of a laser spot in the optical axis direction.

A value absolutizing circuit 2 delivers an absolute value of FE signal 1 referenced to a reference level. The output of the value absolutizing circuit is connected to non-inverting input terminals of comparison circuits 5 and 6.

A first threshold level voltage 3 is set to a level th1 for detecting that the output of value absolutizing circuit 2 exceeds a first predetermined voltage. The setting level th1 is set with a predetermined value which permits detection of a first peak of change in level of the FE signal when a defocus develops.

A second threshold level voltage 4 is set to a level th2 for detecting that the output of value absolutizing circuit 2 exceeds a second predetermined voltage. A predetermined value set to the setting level th2 permits detection of a second peak of change in level of the FE signal when the defocus develops.

It will be appreciated that the second peak of FE signal during the defocusing is smaller than the first peak level under the influence of a spherical aberration. Therefore, the setting value th2 of second threshold value voltage is less than the setting value th1 of first threshold value voltage. Supposedly, in the present embodiment, the setting value th2 of second threshold value voltage is half the setting value th1 of first threshold value voltage.

The comparison circuit 5 includes its non-inverting input terminal connected to the output of value absolutizing circuit 2 and its inverting input terminal connected to the output of first threshold value voltage 3. The comparison circuit 5 delivers a high (Hi) level when the output signal level of value absolutizing circuit 2 exceeds the first threshold value voltage and a low (Low) level when that output signal level is less than the second threshold value voltage.

A memory circuit 7 stores a polarity, referenced to a reference voltage, of the FE signal at the timing that the output of comparison circuit 5 turns to the Hi level. By rule, the Hi level is stored when the positive polarity prevails with the Low level stored for the negative polarity.

A memory circuit 8 stores a polarity, referenced to the reference voltage, of the FE signal at the timing that the output of comparison circuit 6 turns to the Hi level. By rule, the Hi level is stored when the positive polarity prevails with the Low level stored for the negative polarity.

A polarity decision circuit 9 compares the polarities of FE signal stored in the memory circuits 7 and 8 and delivers a Hi level when the polarities differ from each other and a Low level for the polarities being equal.

A first logical product circuit 10 delivers a logical product of outputs of the polarity decision circuit 9 and comparison circuit 6.

A monostable multivibrator circuit 11 delivers a Hi level signal only for a predetermined period starting to elapse after the output of the comparison circuit 5 has turned to the Hi level.

A second logical product circuit 12 delivers a logical product of outputs of the first logical product circuit and monostable multivibrator circuit 11.

A defocus detection signal 13 is delivered out of the second logical product circuit 12.

Figure 10:
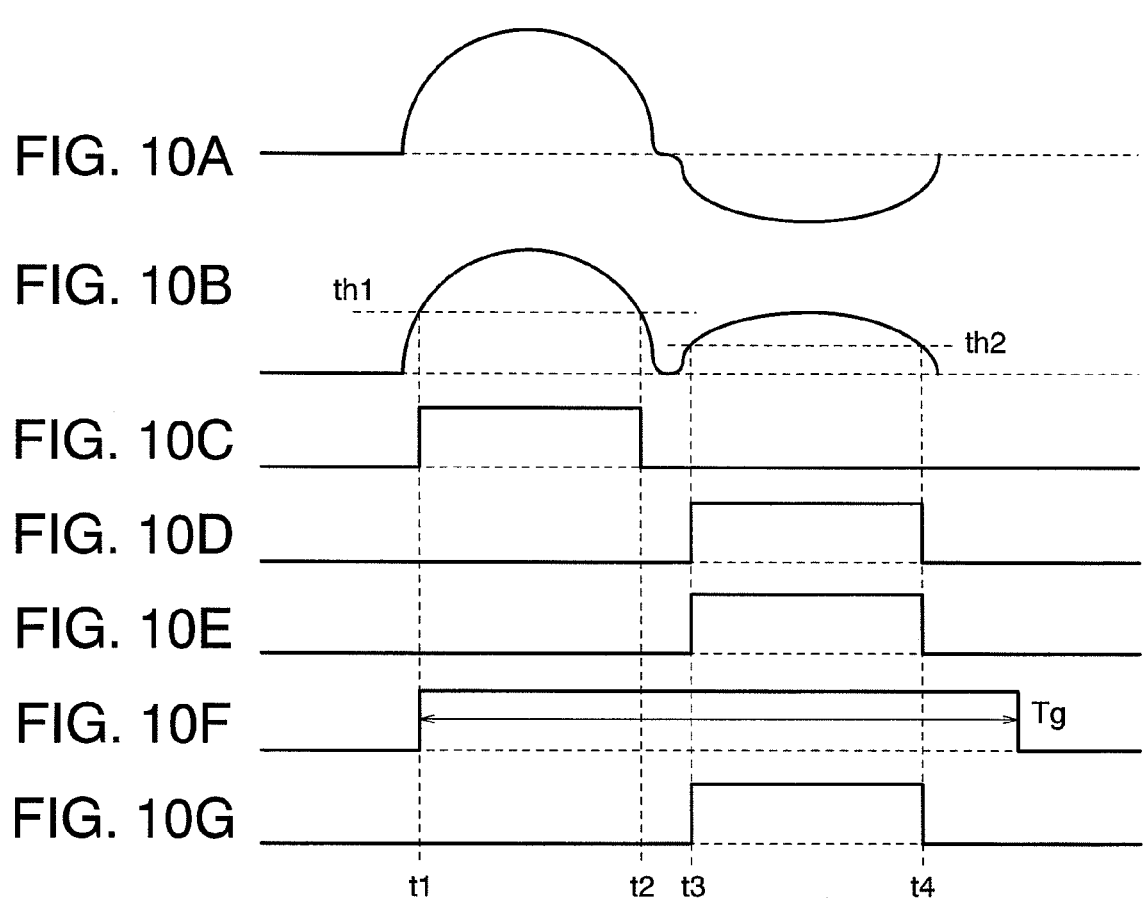
FIGS. 10A-10G are waveform diagrams useful to explain operation of the first embodiment of this invention.

With the construction as above, the defocus detection device operates as will be described below with reference to FIG. 10 showing output waveforms of individual blocks in FIG. 1.

Illustrated in FIG. 10A is a FE signal when a defocus develops which indicates that with the lens defocused, the FE signal first assumes a positive-going change exceeding the reference level to exhibit a first convex change. Thereafter, the FE signal assumes a negative-going change which zero-crosses to fall below the reference level, exhibiting a second convex change. Supposedly, in FIG. 10A, comparison of the first and second convex changes shows that the peak level of first convex change is twice in absolute value that of second convex change.

The output of the value absolutizing circuit 2 is depicted in FIG. 10B. This output goes beyond the setting level th1 of first threshold value voltage 3 shown at dotted line in the figure during a period ranging from time t1 to time t2. Further, during a period of from time t3 to time t4, the output is in excess of the setting level th2 of second threshold value voltage 4 shown at dotted line in the figure.

The output of the comparison circuit 5 is depicted in FIG. 1C, assuming the Hi level for the period (from time t1 to time t2) during which the output of value absolutizing circuit 2 shown in FIG. 10B goes beyond the setting level th1 of first threshold value voltage 3. In this phase, the FE signal is in excursion of positive polarity and hence the memory circuit 7 stores the Hi level.

The output of the comparison circuit 6 is depicted in FIG. 10D, assuming the Hi level for the period (from time t3 to time t4) during which the output of value absolutizing circuit 2 shown in FIG. 10B goes beyond the setting level th2 of second threshold value voltage 4. At that time, since the FE signal is in excursion of negative polarity, the memory circuit 8 stores the Low level.

Illustrated in FIG. 10E is the output of first logical product circuit 10. The polarities of the FE signal stored in the memory circuits 7 and 8 are different corresponding to the Hi level and Low level, respectively, and therefore, the output of polarity decision circuit 9 representing one input to the first logical product circuit 10 assumes Hi level. As a consequence, the first logical product circuit 10 delivers the same output as that at (d) of the second comparison circuit 6.

Illustrated in FIG. 10F is the output of monostable multivibrator circuit which is at Hi level for a predetermined period of Tg following the time t1 that the first comparison circuit 5 turns to the Hi level. The period Tg for delivery of the Hi level is preferably about 5 ms.

The output of second logical product circuit 12, that is, the defocus detection signal 13 is depicted in FIG. 10G. The defocus detection signal 13 assumes the Hi level for the period during which the output of monostable multivibrator shown in FIG. 10F is at the Hi level and at the same time the output of second logical product circuit 10 shown in FIG. 10E is at the Hi level. In other words, the defocus can be detected at time t3.

In the defocus detection device operating in the way as above, the absolute value of the FE signal is monitored to detect the first convex change over the period of from t1 to t2 and thereafter when the second convex change of opposite polarity whose duration is from t3 to t4 is detected within the predetermined period Tg, this change is detected as a signal indicative of the defocus.

Figure 11:
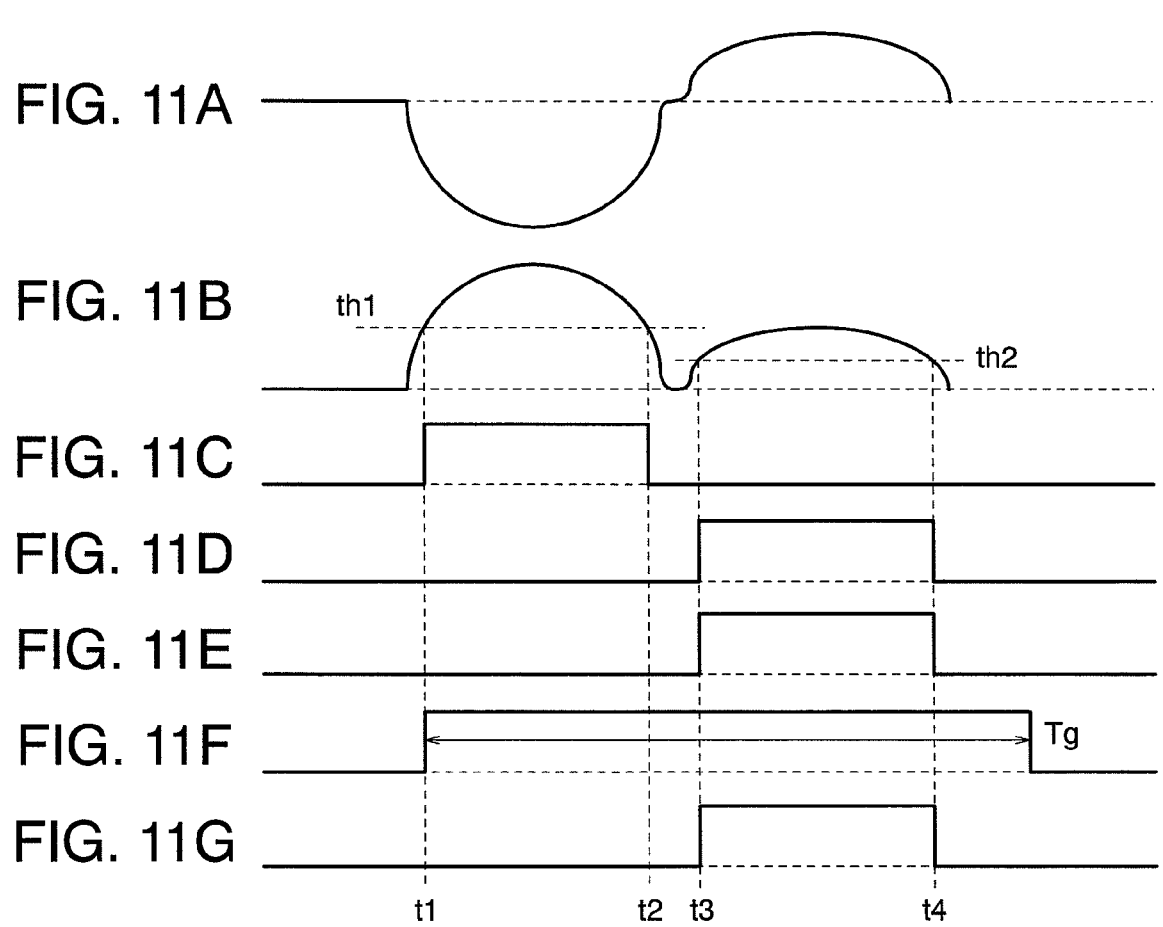
FIGS. 11A-11G are waveform diagrams useful to explain another type of operation of the first embodiment of this invention.

The waveforms shown in FIGS. 10A-10G are useful to explain a defocus tracing from point C to point B in FIG. 8A but waveform developing when a defocus traces from point C to point B are illustrated in FIG. 11. It is supposed in FIG. 11 that the spherical aberration correction device is adjusted optimally for the recording layer L2.

Illustrated in FIG. 11A is a FE signal developing during the defocus tracing from point C to point B in FIG. 8A, having its polarity opposite to that of the FE signal shown in FIG. 10B. Further, the output of value absolutizing circuit 2 is depicted in FIG. 11B as being the same as that in FIG. 10B because the signals in FIG. 10A and in FIG. 11A are the same with only exception of their polarities. Likewise, waveforms in FIGS. 11C-11G are the same as those in FIGS. 10C-10G.

As will be seen from the above, even when the direction of a defocus differs, the polarity of FE signal in FIG. 11A alone is inverted with the remaining signal waveforms intact and as in the case of FIG. 10A, the defocus can be detected at time t3.

Since in the defocus detection device according to the first embodiment set forth so far, a temporal restriction by dint of the monostable multivibrator circuit is imposed on the defocus detection, the defocus detection is hardly affected by noises in FE signal attributable to strain in the disk. Further, by making the threshold value voltage for detection of the second convex change of the FE signal developing after the defocus smaller than the threshold value voltage for detection of the second convex change, the influence of the spherical aberration can be avoided.

Furthermore, structurally, the defocus detection signal may be inputted to a system controller of the optical disk unit and the system controller may instantaneously stop recording of data when a defocus is detected on the basis of the defocus signal, thereby making it possible to prevent an erroneous recording on a different layer. Thanks to this, a highly reliable optical disk unit can be provided.

Embodiment 2

Next, a second embodiment of this invention will be described. While in the foregoing first embodiment the defocus detection method has been described in terms of hardware, the defocus detection will be described in terms of software in the second embodiment.

Figure 12:
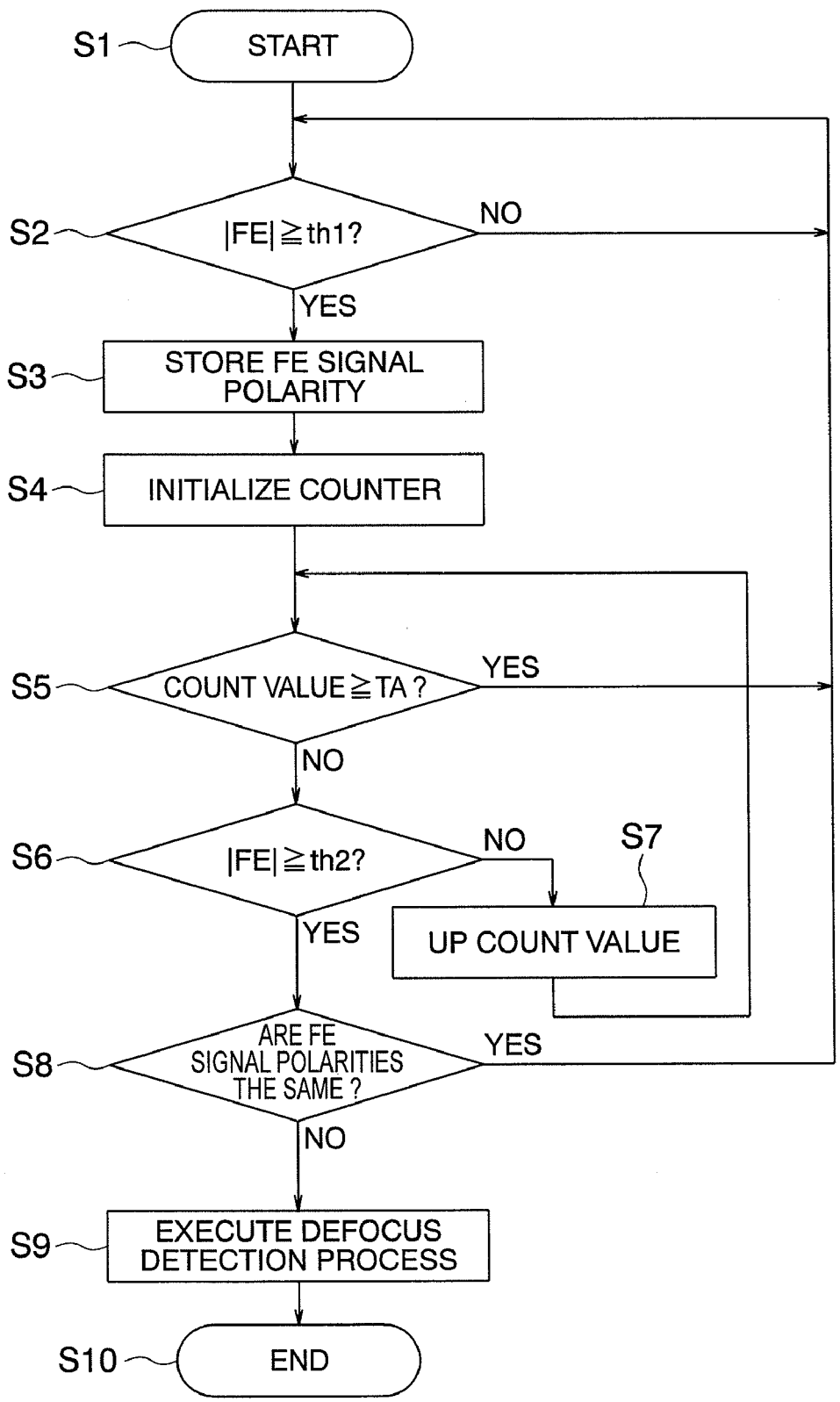
FIG. 12 is a flowchart showing a second embodiment of this invention.

Operation will now be described with reference to a flowchart of FIG. 12.

When a defocus detection operation is started (S1), the system controller in the optical disk unit monitors a FE signal to decide whether the absolute value of the FE signal exceeds the first threshold value th1 (S2) and if the absolute value is determined as being less than the threshold value th1 (No), the system controller continues monitoring a FE signal. If the absolute value is determined as going beyond the threshold value th1 (Yes), the system controller stores a polarity of the FE signal at that time (S3) and initializes the timerer built in the system controller to zero (0) (S4). In other words, the above steps S3 and S4 are executed at timing corresponding to the time t1 at which the absolute value of the FE signal shown at (b) in FIG. 10 exceeds the threshold value th1.

In addition, it is decided whether a timer value delivered out of the timerer goes beyond the predetermined value Tg (S5). If the timer value exceeds Tg (Yes), a FE signal is again monitored (S2). If the timer value is less than Tg (No), the FE signal is monitored to decide whether its absolute value is in excess of the second threshold value th2 (S6) and with the absolute value determined as being less than the threshold value th2 (No), the timer value is upped (S7) and a resulting timer value is again compared with the predetermined value Ta (S5). To add, since a series of operations starting from the step S5 and ending in the step S7 is completed within the predetermined period, the timer value in excess of the predetermined value Tg signifies that the predetermined period is exceeded and the measuring time is over.

If the absolute value of FE signal exceeds the second threshold value th2 (Yes), the polarity of FE signal precedently stored is compared with that of FE signal at present (S8). In other words, the timing for the step S8 to be executed corresponds to time t3 from which the absolute value of FE signal goes beyond the threshold value th2. When the comparison result shows that the two polarities are equal (Yes), a defocus is not determined and monitoring of a FE signal again proceeds (S2).

Contrarily, with the two polarities determined as being different from each other (No), a defocus is determined and a defocus detection process is executed (S9) and then the series of operations ends (S10). The defocus detection process (S9) is necessary in the event of occurrence of a defocus to perform such an operation as stopping data recording or once turning off the servo control and then restarting it.

Through the above operation, the defocus can be detected at time t3 in FIG. 10 and therefore the system controller can undertake the necessary process such as stopping of data recording.

Figure 9:
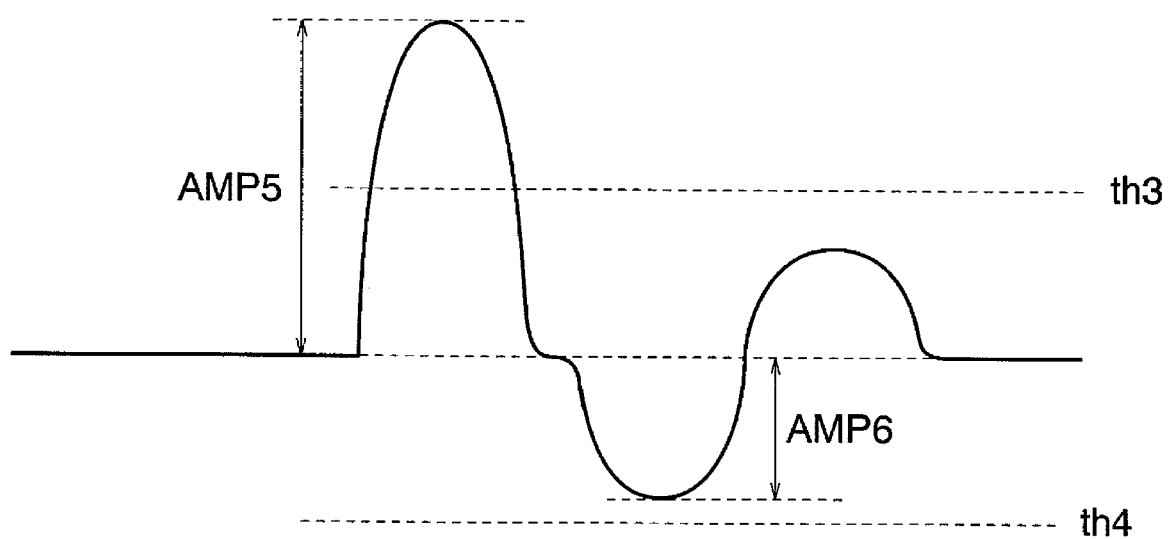
FIG. 9 is a waveform diagram of a focus error signal when the lens defocuses in the presence of a spherical aberration.
Figure 13:
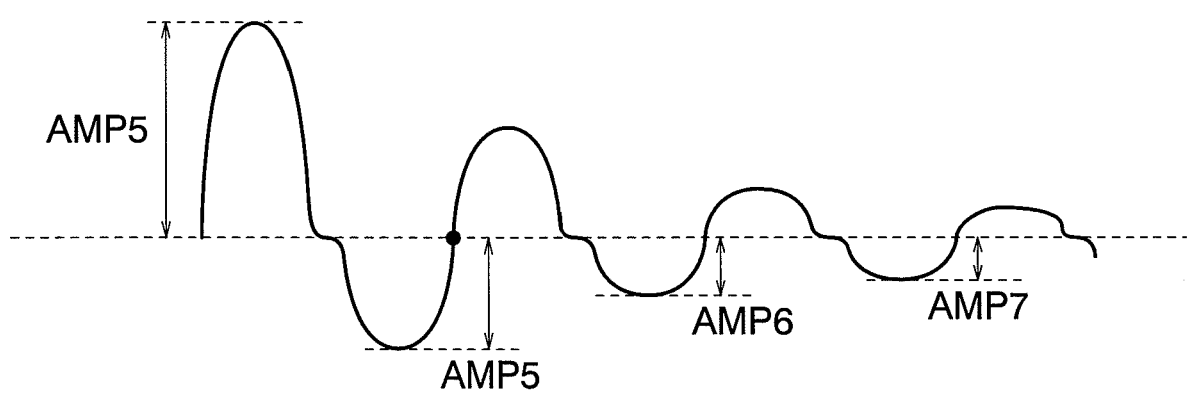
FIG. 13 is a diagram of a focus error signal waveform developing when the lens defocuses in an optical disk of three or more layers.

While the foregoing embodiments of this invention have been described by way of the double-layer disk, the present invention can also be applied similarly to an optical disk of three or more layers. Conceivably, the FE signal in the case of a defocus developing in the double-layer disk as shown in FIG. 9 can be applicable to an optical disk of M layers (M>3) as shown in FIG. 13.

More specifically, as the lens defocuses to sequentially go across different layers in succession, the spherical aberration gradually increases and responsive thereto, the change level of a focus error signal decreases gradually. Since in FIG. 13 the beam spot is brought into just focus on an adjacent layer at a black dotted position, a defocus must be detected at a timing earlier than this black dotted position in order to prevent an erroneous recording.

Embodiment 3

An example of a product to which the defocus detection device described in embodiment 1 or the defocus detection method described in embodiment 2 is applied will be described.

Figure 14:
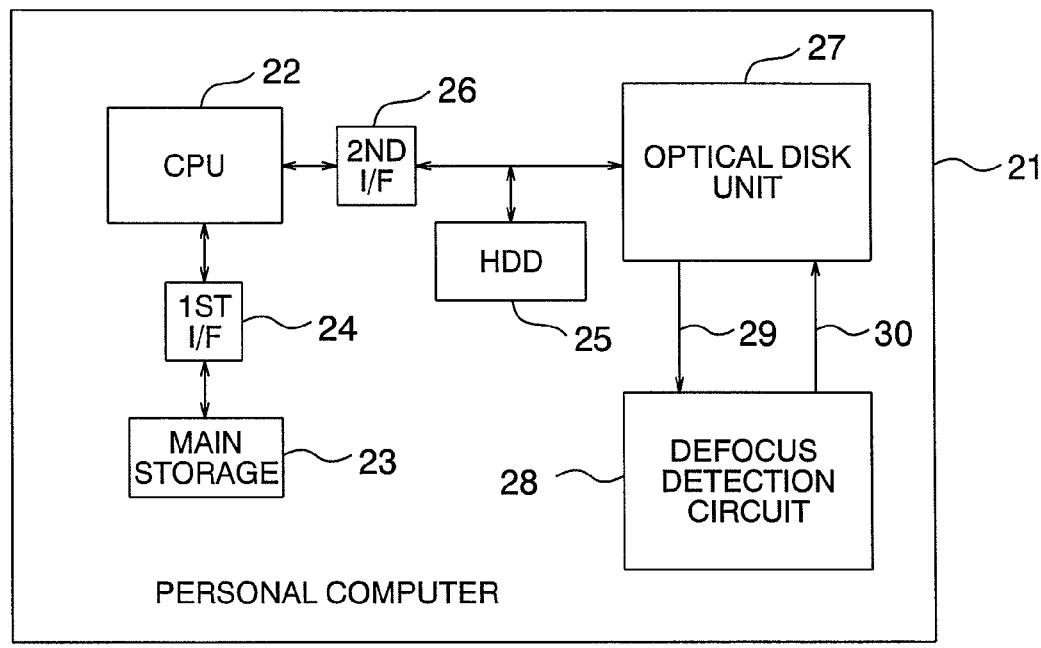
FIG. 14 is a block diagram showing a third embodiment of this invention.

Turning now to FIG. 14, a personal computer is illustrated in block diagram form. The personal computer designated at reference numeral 21 in FIG. 14 comprises constituent components given below.

A central processing unit (hereinafter simply referred to as CPU) 22 processes various kinds of information so as to input/output data to/from individual peripheral equipments coupled to the CPU.

A main storage 23 stores data necessary for the CPU to process operations. Generally, a synchronous dynamic random access memory (SDRAM) is used as the main storage.

A first interface circuit 24 intervenes to connect the CPU 22 to the main storage 23.

A hard disk drive 25 records various kinds of information.

A second interface circuit 26 intervenes to connect the CPU 22 to the hard disk drive 25.

An optical disk unit 27 includes an optical pickup, a loading mechanism unit, a spindle motor and a control circuit for controlling them and it operates to reproduce information from an optical disk and record information onto the optical disk.

Denoted by 28 is a defocus detection circuit corresponding to the defocus detection device described in connection with embodiment 1 or a microcomputer for execution of the defocus detection method described in connection with embodiment 2. The defocus detection circuit 28 is supplied with a focus error signal 29 from the optical disk unit 27. Conversely, the defocus detection circuit 28 supplies a defocus detection signal 30 to the optical disk unit 27. The defocus detection signal 30 connects to the control circuit inside optical disk unit 27 to serve as an interrupt signal.

The personal computer 21 may additionally comprise a user input/output interface equipment such as keyboard, mouse or display not shown.

With the construction as above, when, for example, information stored in the hard disk drive 25 is to be recorded on the optical disk by means of the optical disk unit, the CPU 22 reads the target information from the hard disk drive 25 through the second interface circuit 26 and stores it in the main storage 23 through the first interface circuit 24. Then, the CPU 22 sends the information stored in the main storage 23 to the optical disk unit 27 via the first and second interface circuits and commands the optical disk unit 27 to perform a recording operation.

In the event that any external disturbance such as, for example, a vibration is applied to the optical disk unit 27 during recording of information onto the optical disk and a defocus toward another layer develops, the defocus detection circuit 28 detects the defocus. As a consequence, the defocus detection circuit 28 outputs, as the defocus detection signal 30, a signal resembling that shown in FIG. 10G or FIG. 11G to apply interrupt processing to the control circuit inside optical disk unit 27.

Consequently, the control circuit inside optical disk unit 27 detects the defocus and immediately stops the operation of recording onto the optical disk and besides turns off both of the focus servo and tracking servo. In this manner, even when the defocus develops, the optical disk unit 27 can be kept from committing an erroneous record onto another recording layer.

Thereafter, the control circuit inside optical disk unit 27 again turns on the focus servo and tracking servo to position the optical pickup at a location immediately preceding the recording stoppage and resumes the recording operation temporarily deactivated till then. In this manner, the information can be recorded on the optical disk without midway interruption. In addition, the defocus can be dealt with by means of only the optical disk unit 27 and defocus detection device 28, with the result that the load on the CPU 22 can be kept from increasing and the CPU 22 can execute other applications without interruption.

The present embodiment has been described by way of example of the personal computer but this invention can also be applied in a similar way even to another computer system such as work-station or mainframe, provided that it includes the optical disk unit 27 and defocus detection circuit 28 as constituent components.

While in FIG. 14 the optical disk unit 27 and defocus detection circuit 28 are illustrated as being separate components, the defocus detection circuit 28 may be incorporated in the optical disk unit 27.

Further, in place of the hard disk drive 25, another type of memory device for use with an optical disk unit other than the optical disk unit 27 or a magneto optical disc (MO) unit may be used.

Embodiment 4

Another example of a product to which the defocus detection device described in embodiment 1 or the defocus detection method described in embodiment 2 will be described.

Figure 15:
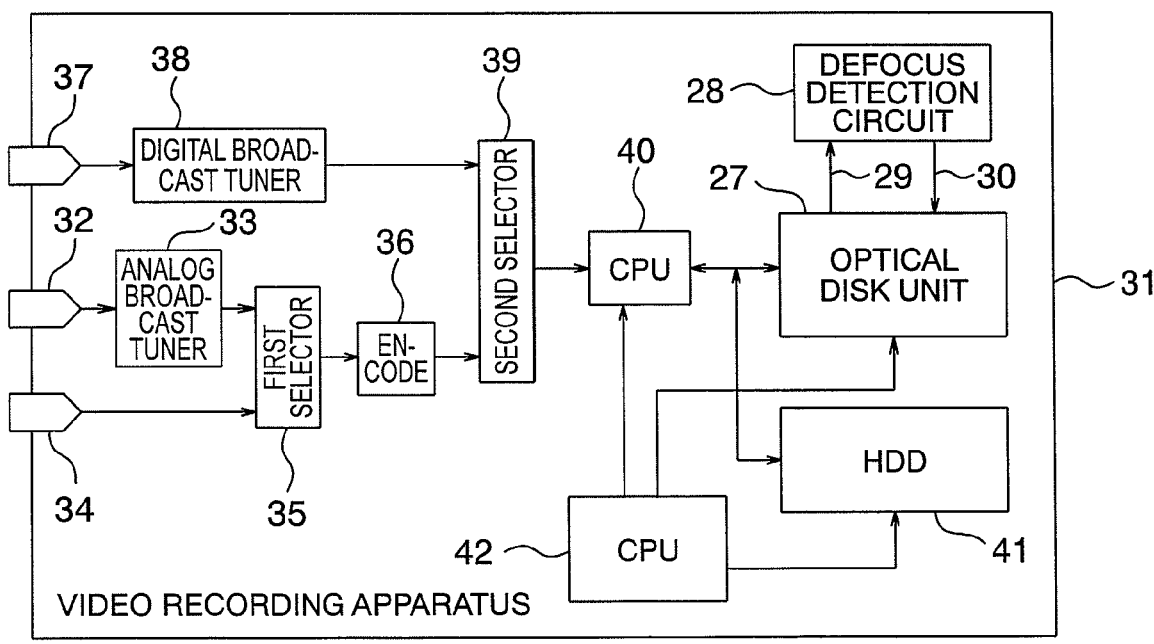
FIG. 15 is a block diagram showing a fourth embodiment of this invention.

A video recording apparatus is illustrated in block diagram form in FIG. 15. Denoted by 31 is the video recording apparatus which comprises constituent components given below. The same constituents as those in FIG. 14 are designated by the same reference numerals and will not be described herein.

An analog broadcast input terminal 32 receives a reception signal of ground wave analog broadcast.

An analog broadcast tuner 33 selects and outputs a video signal of a given broadcasting station.

An external input terminal 34 receives a video signal delivered out of another video equipment.

A first selection circuit 35 selects and outputs either the video signal delivered out of the analog broadcast tuner 33 or the video signal inputted to the external input terminal 34.

An encoder circuit 36 encodes the video signal the first selection circuit 35 outputs into a predetermined format to deliver streaming data. Supposedly, the video signal in the present embodiment is in MPEG2 format.

A ground wave digital broadcast input terminal 37 receives a reception signal of ground wave digital broadcast.

A ground wave digital broadcast tuner 38 selects a video signal of a desired broadcasting station from the reception signal inputted to the ground wave digital broadcast input terminal and outputs the selected signal in the form of streaming data. Supposedly, videos of ground wave digital broadcast are in MPEG2 format.

A second selection circuit 39 selects and outputs either the streaming data delivered out of the encoder circuit 36 or the streaming data delivered out of the ground wave digital broadcast tuner 38.

A buffer circuit 40 is used for buffering of the streaming data of second selection circuit 39 and of streaming data an optical disk unit 27 or a hard disk drive (HDD) 41 to be described later delivers.

Saved in the HDD 41 are video data.

A CPU 42 controls the second selection circuit 39, buffer circuit 40, optical disk unit 27 and HDD 41 in order to control input/output of streaming data to/from the buffer circuit 40.

It will be appreciated that a focus error signal 29 is supplied from the optical disk unit 27 to a defocus detection circuit 28 and a defocus detection signal 30 is supplied from defocus detection circuit 28 to optical disk unit 27. The defocus detection signal 30 connects to the control circuit inside optical disk unit 27 to serve as an interrupt signal.

With the construction as above, recording of videos of analog broadcast, for example, onto the optical disk is carried out as will be described below.

A video signal of analog broadcast inputted to the analog broadcast input terminal 32 is passed through the first selection circuit 35 and encoder circuit 36 so as to be converted into streaming data which in turn is passed through the second selection circuit 39 so as to undergo buffering by means of the buffer circuit 40. With the amount of streaming data buffered in the buffer circuit 40 to some extent, the CPU 42 commands the optical disk unit 27 to record streaming data inside buffer circuit 40 onto an optical disk. In this manner, a video of analog broadcast can be recorded on the optical disk.

It will be appreciated that a video signal received at the external input terminal 34 and passed through a different path preceding the first selection circuit 35 and a video signal received at the ground wave digital broadcast input terminal 37 are processed, as in the precedence, in the second selection circuit 39 and succeeding stage so as to be recorded on the optical disk.

In dubbing a video recorded in the HDD 41 onto the optical disk, streaming data in the HDD 41 is buffered in the buffer circuit 40. Then, when the amount of data in the buffer circuit 40 comes up to some extent, the CPU 42 commands the optical disk unit 27 to record streaming data in buffer circuit 40 onto the optical disk. In this manner, the video in the HDD 41 can be dubbed onto the optical disk.

As will be seen from the above, various kinds of input videos and videos recorded on the HDD 41 can be recorded on the optical disk.

In the event that any external disturbance such as a vibration is applied to the optical disk unit 27 during recording of video data onto the optical disk and a defocus toward another layer develops, the defocus detection circuit 28 detects the defocus. As a consequence, the defocus detection circuit 28 outputs, as the defocus detection signal 30, a signal resembling that shown in FIG. 10G or 11G to apply interrupt processing to the control circuit inside optical disk unit 27.

Consequently, the control circuit inside optical disk unit 27 detects the defocus and immediately stops the operation of recording onto the optical disk and besides turns off both of the focus servo and tracking servo. In this manner, even when the defocus develops, the optical disk unit 27 can be kept from committing an erroneous record onto another recording layer.

Thereafter, the control circuit inside optical disk unit 27 again turns on the focus servo and tracking servo to position the optical pickup at a location immediately preceding the recording stoppage and resumes the recording operation temporarily deactivated till then. This ensures that the information can be recorded on the optical disk without midway interruption. Further, the defocus can be dealt with by means of only the optical disk unit 27 and defocus detection circuit 28 and the load on the CPU 22 can be kept from increasing, with the result that the CPU 22 can execute another type of operation, for example, follow-up reproduction without interruption.

In FIG. 15, the optical disk unit 27 and defocus detection circuit 28 are illustrated as being separate constituent components but alternatively, the defocus detection circuit 28 may be incorporated in the optical disk unit 27.

According to the present invention, the defocus can be detected at the timing earlier than the black dotted position and consequently, a focus error signal waveform appearing after the black dot is meaningless. In this manner, according to the present invention, the defocus can be detected even in the multi-layer optical disk of three or more layers through the same operation as that for the double-layer optical disk.

It should be further understood by those skilled in the art that although the foregoing description has been made on embodiments of the invention, the invention is not limited thereto and various changes and modifications may be made without departing from the spirit of the invention and the scope of the appended claims

What is claimed is:

1. A defocus detection device for use with an optical disk having a plurality of recording layers, comprising:
    first detection means for detecting that a focus error signal goes beyond a first predetermined level;
    second detection means for detecting that said focus error signal exceeds a second predetermined level of a polarity opposite to that of the first predetermined level; and
    time measurement means for measuring a time starting to elapse after the focus error signal has gone beyond said first predetermined level,
    wherein when said second detection means detects that the focus error signal exceeds said second predetermined level before said time measurement means measures a predetermined time, a defocus detection signal is outputted.

2. A defocus detection device according to claim 1, wherein said second predetermined level has an absolute value smaller than that of said first predetermined level.

3. An optical disk unit for recording/reproducing information to/from an optical disk having a plurality of recording layers, comprising the defocus detection device as recited in claim 1, wherein when said defocus detection device detects a defocus, recording to said optical disk is stopped.

* * * * *